(12) United States Patent
Sugihara et al.

(10) Patent No.: US 11,434,137 B2
(45) Date of Patent: Sep. 6, 2022

(54) ULTRAFINE-BUBBLE GENERATION AGENT INCLUDING HIGH-CO2-CONTENT ICE

(71) Applicant: NIPPON EKITAN CORPORATION, Tokyo (JP)

(72) Inventors: Yoshihiko Sugihara, Tokyo (JP); Takahiro Eguchi, Tokyo (JP); Hiroyuki Murakami, Tokyo (JP)

(73) Assignee: NIPPON EKITAN Corporation, Tokyo (JP)

( * ) Notice: Subject to any disclaimer, the term of this patent is extended or adjusted under 35 U.S.C. 154(b) by 120 days.

(21) Appl. No.: 16/977,567

(22) PCT Filed: Mar. 1, 2019

(86) PCT No.: PCT/JP2019/008188
§ 371 (c)(1),
(2) Date: Sep. 2, 2020

(87) PCT Pub. No.: WO2019/172140
PCT Pub. Date: Sep. 12, 2019

(65) Prior Publication Data
US 2021/0009429 A1    Jan. 14, 2021

(30) Foreign Application Priority Data
Mar. 5, 2018   (JP) .............................. JP2018-038769

(51) Int. Cl.
*C01B 32/50*   (2017.01)
(52) U.S. Cl.
CPC .................... *C01B 32/50* (2017.08)

(58) Field of Classification Search
CPC ... A23L 2/54; C01B 32/50; F25C 1/00; F25C 2700/00
See application file for complete search history.

(56) References Cited

U.S. PATENT DOCUMENTS

| | | | | |
|---|---|---|---|---|
| 4,285,977 A | * | 8/1981 | Yezek | A23L 2/54 426/477 |
| 4,934,153 A | * | 6/1990 | Ebinuma | C01B 32/50 62/66 |

(Continued)

FOREIGN PATENT DOCUMENTS

| | | |
|---|---|---|
| JP | 06-039243 A | 2/1994 |
| JP | 2004-330050 A | 11/2004 |

(Continued)

OTHER PUBLICATIONS

Adisasmito et al., "Hydrates of Carbon Dioxide and Methane Mixtures," J. Chem. Eng. Data, 1991, 36:68-71.

(Continued)

*Primary Examiner* — Timothy C Vanoy
(74) *Attorney, Agent, or Firm* — Foley & Lardner LLP

(57) ABSTRACT

An object of the present invention is to provide an ultrafine bubble generating agent capable of easily generating ultrafine bubbles in a liquid without requiring an ultrafine-bubble generator, a method for producing an ultrafine bubble-containing liquid, an ultrafine bubble-containing liquid produced by the same production method, and the like. The method for producing an ultrafine bubble-containing liquid of the present invention comprises melting ice having a $CO_2$-content rate of 3 wt % or more (preferably a $CO_2$ hydrate).

5 Claims, 7 Drawing Sheets

(56) References Cited

U.S. PATENT DOCUMENTS

| | | | | |
|---|---|---|---|---|
| 5,366,745 A | * | 11/1994 | Daden | B01F 23/23611 |
| | | | | 261/DIG. 7 |
| 5,404,727 A | * | 4/1995 | Baker | C01B 21/22 |
| | | | | 62/69 |
| 6,349,565 B1 | * | 2/2002 | Greer | B01D 7/00 |
| | | | | 62/543 |
| 2019/0010433 A1 | | 1/2019 | Tsuji et al. | |

FOREIGN PATENT DOCUMENTS

| | | |
|---|---|---|
| JP | 2005-224146 A | 8/2005 |
| JP | 2007-275893 A | 10/2007 |
| JP | 2007-289256 A | 11/2007 |
| JP | 2008-149209 A | 7/2008 |
| JP | 2011-050398 A | 3/2011 |
| JP | 4969683 B2 | 7/2012 |
| WO | WO 2017/110092 A1 | 6/2017 |

OTHER PUBLICATIONS

Yasuda et al,. "Phase Equilibrium for Clathrate Hydrates Formed with Methane, Ethane, Propane, or Carbon Dioxide at Temperatures below the Freezing Point of Water," J. Chem. Eng. Data, 2008, 53:2182-2188.

* cited by examiner

[Fig. 1]
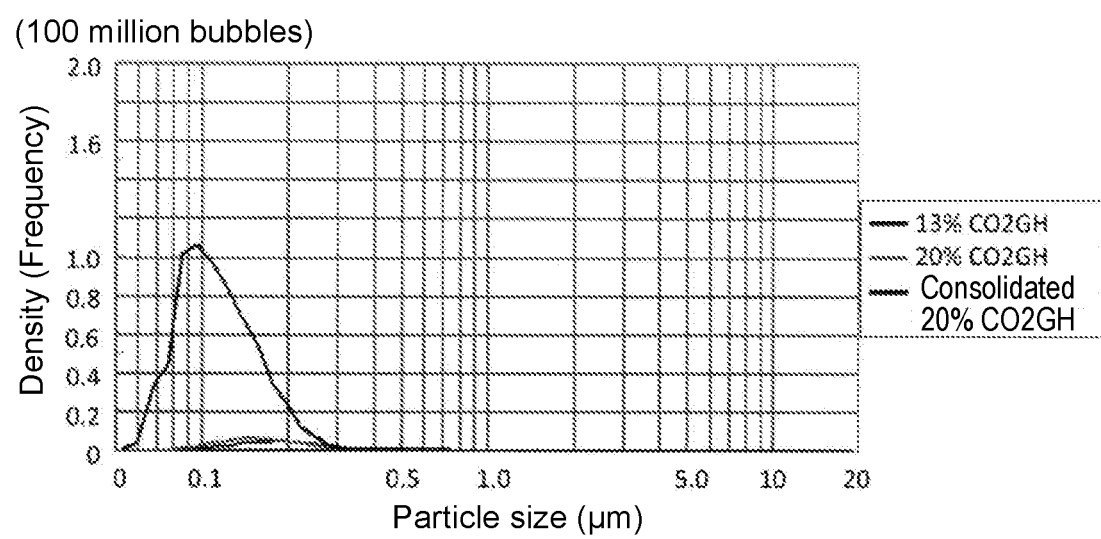
[Fig. 2]
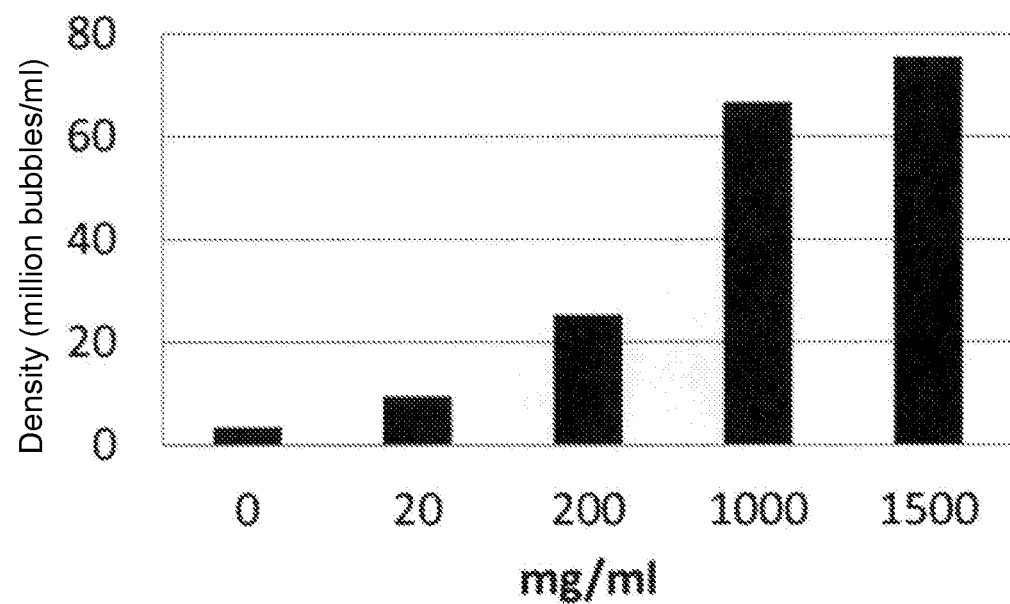

[Fig. 3]
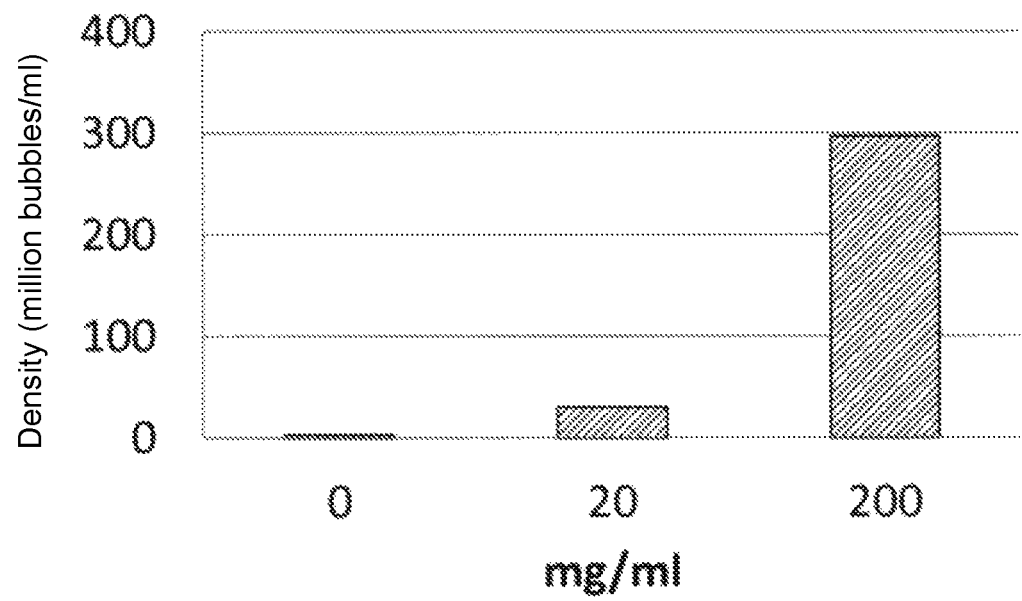
[Fig. 4]
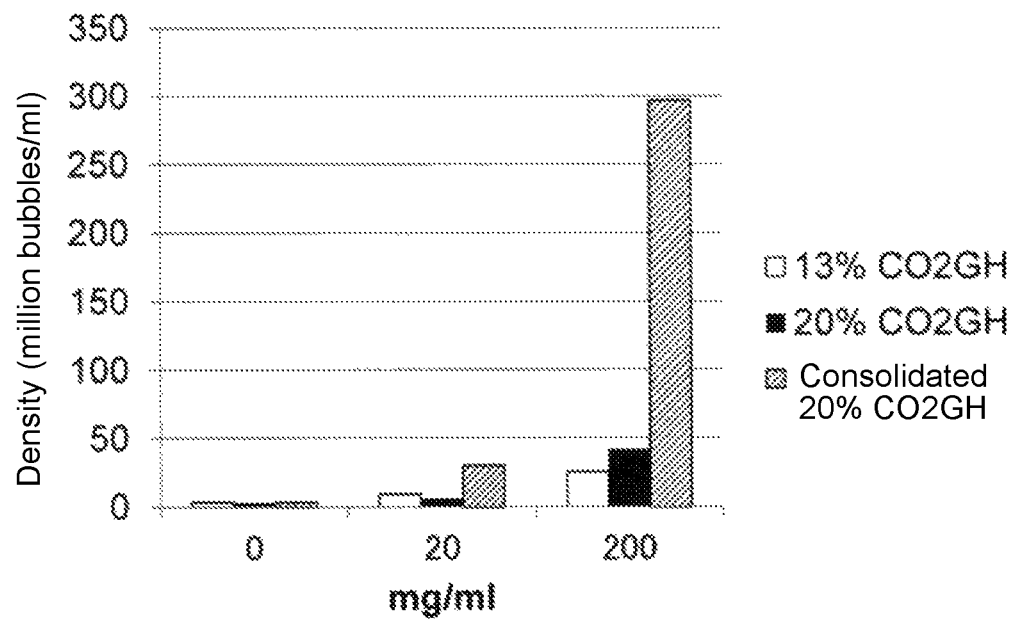

[Fig. 5]
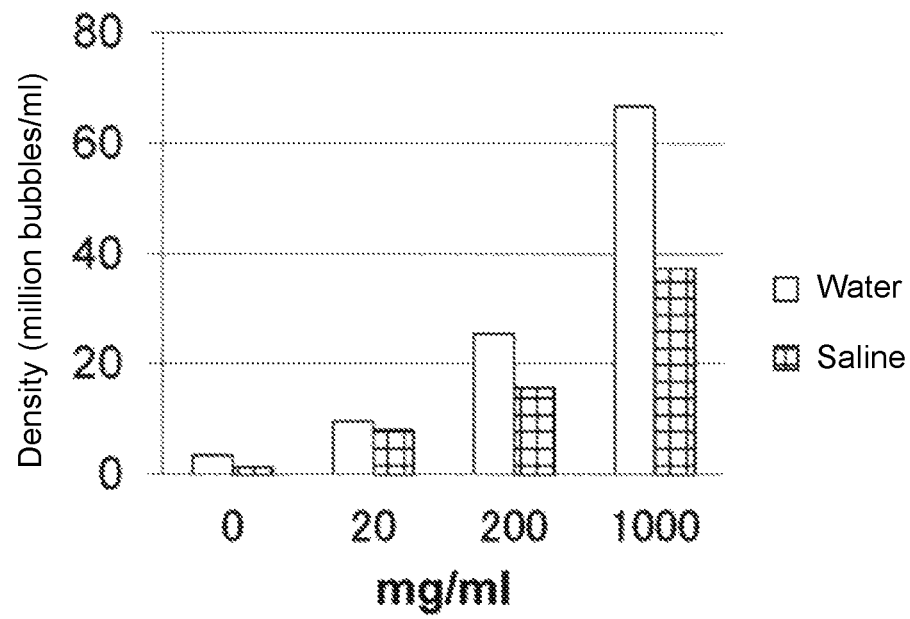
[Fig. 6]
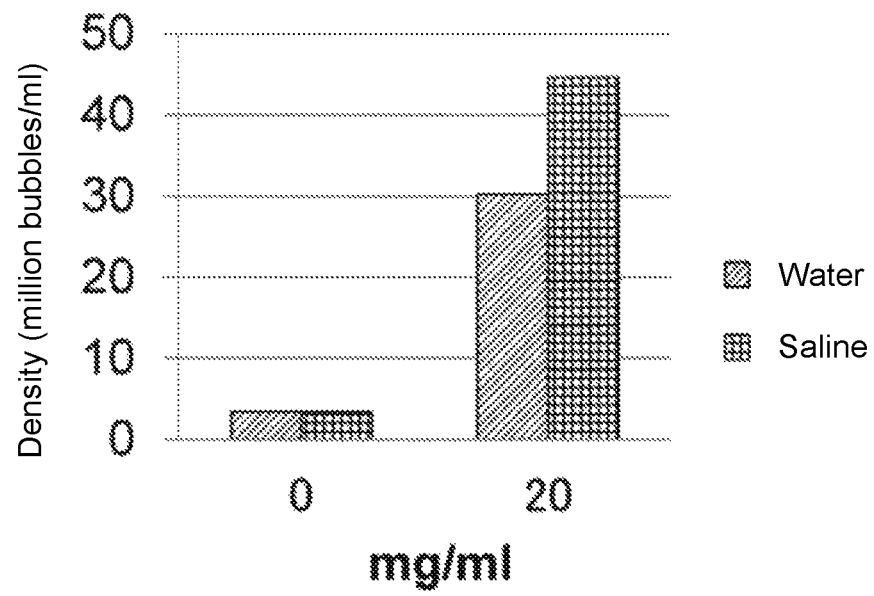

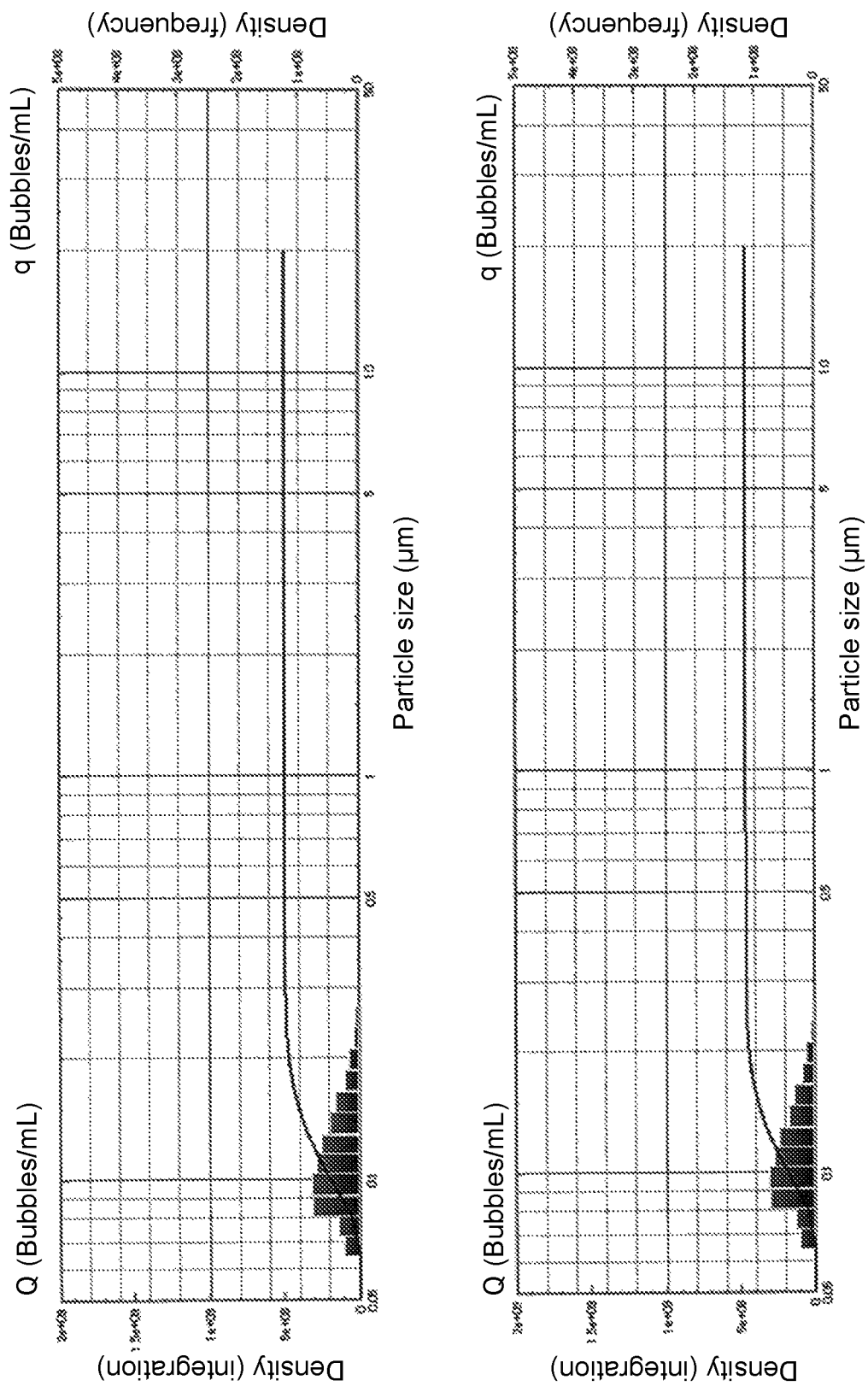

[Fig. 8]
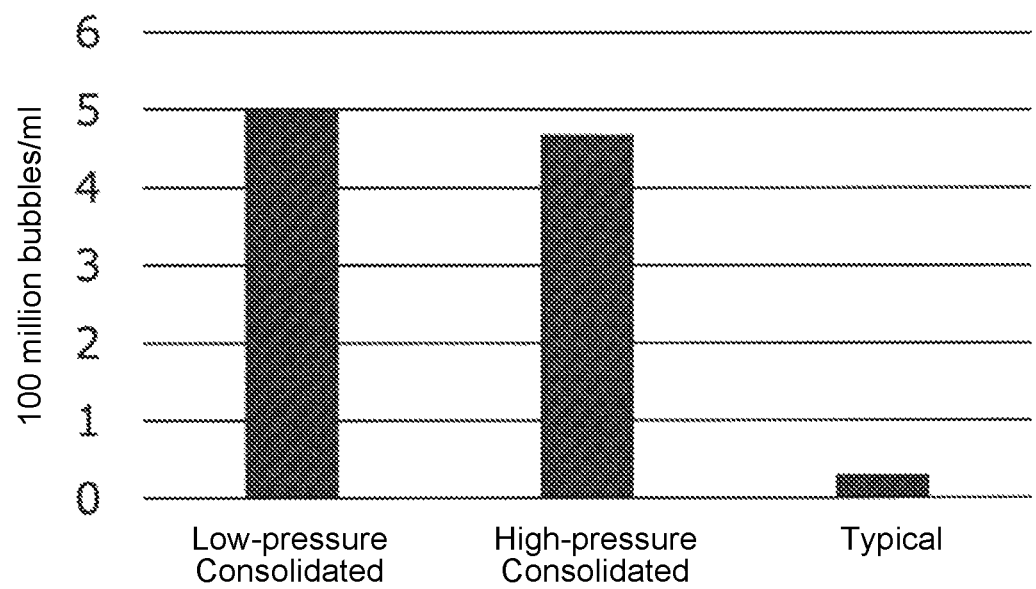

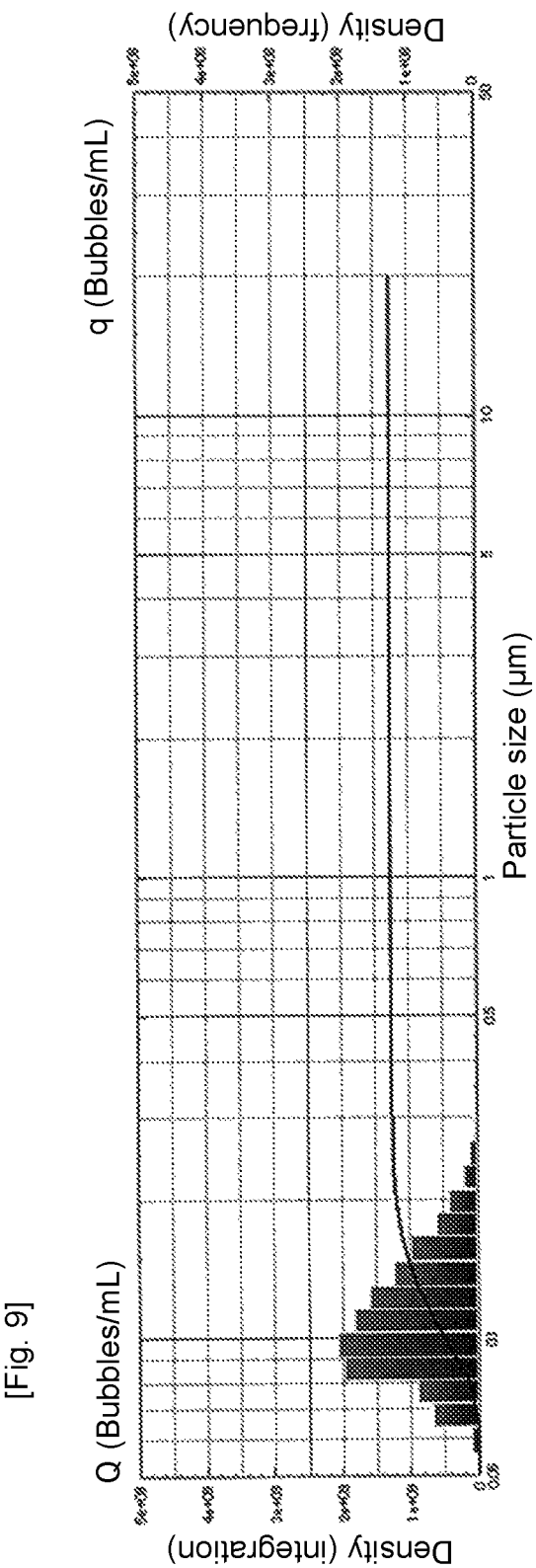
[Fig. 9]

[Fig. 10]
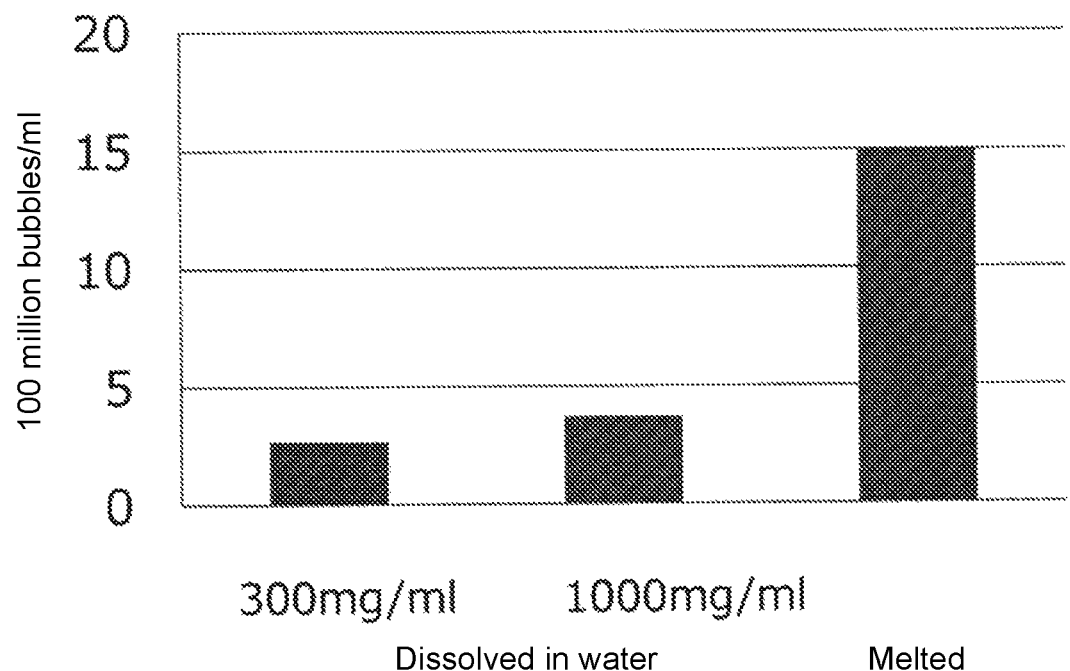
[Fig. 11]
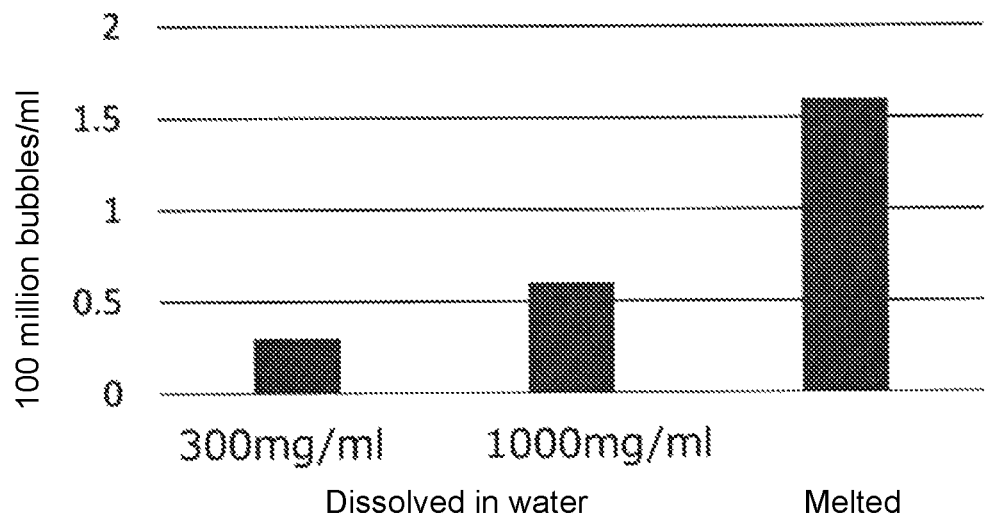

ULTRAFINE-BUBBLE GENERATION AGENT INCLUDING HIGH-CO2-CONTENT ICE

CROSS-REFERENCE TO RELATED APPLICATIONS

This application is the U.S. National Stage of PCT/JP2019/008188, filed Mar. 1, 2019, which claims priority to JP 2018-038769, filed Mar. 5, 2018.

TECHNICAL FIELD

The present invention relates to an ultrafine bubble generating agent for generating ultrafine bubbles in a liquid, a method for producing an ultrafine bubble-containing liquid, an ultrafine bubble-containing liquid produced by the producing method, and the like.

BACKGROUND ART

Microbubbles having diameters of 1000 nm or less in a solvent such as water under normal pressure are also called "ultrafine bubbles". Such ultrafine bubbles, when compared with typical bubbles having diameters of 1 mm or more, have good qualities such as (1) having a notably large bubble interface surface area, (2) having a high bubble inner pressure, (3) having high gas dissolution efficiency, (4) having a slow bubble rise speed, and the like and for this reason they are considered useful for, for example, cleaning treatment of a semiconductor, water purification treatment or sterilization treatment, or farming oysters or shellfishes. For the method for producing such ultrafine bubbles, various methods have been proposed up to date and have been also practiced (Patent Documents 1, 2, 3). However, these producing methods require an ultrafine-bubble generator and thus have problems limiting usage environment of ultrafine bubbles and having an adverse effects for a consumer to handle easily, for example.

A substance called a $CO_2$ hydrate (carbon dioxide hydrate) is known as a type of ice having a high $CO_2$-content rate. A $CO_2$ hydrate refers to a clathrate compound in which carbon dioxide molecules are trapped within cavities of the crystal structure of water molecules. Water molecules forming a crystal structure are called the "host molecules" and molecules trapped within cavities of the crystal structure of water molecules are called the "guest molecules" or "guest substances". A $CO_2$ hydrate, when melted, breaks down to $CO_2$ (carbon dioxide) and water and thus generates $CO_2$ when melted. A $CO_2$ hydrate can be produced using $CO_2$ and water under the conditions of a low temperature and high $CO_2$ partial pressure and, for example, can be produced under the conditions of being at a certain temperature and $CO_2$ partial pressure being higher than the equilibrium pressure of a $CO_2$ hydrate at that temperature (hereinafter, also described as the "condition for producing a $CO_2$ hydrate"). The above conditions of "being at a certain temperature and $CO_2$ partial pressure being higher than the equilibrium pressure of a $CO_2$ hydrate at that temperature" are presented as, in the equilibrium pressure curve of a $CO_2$ hydrate (for example, the ordinate represents $CO_2$ pressure and the abscissa represents temperature) disclosed in FIG. 2 of Non-patent Document 1, and FIG. 7 and FIG. 15 of Non-patent Document 2, a combination condition of a temperature and $CO_2$ pressure within the region of the high pressure side of the curve (the upper part of the curve in the case where, for example, the ordinate represents $CO_2$ pressure and the abscissa represents temperature in the equilibrium pressure curve of the $CO_2$ hydrate). Alternatively, a $CO_2$ hydrate can also be produced by reacting micro ice, in place of water, with $CO_2$ under the conditions of a low temperature and low $CO_2$ partial pressure. The higher $CO_2$ pressure or the lower temperatures of $CO_2$ and water temperatures get during producing a $CO_2$ hydrate, a $CO_2$-content rate of a $CO_2$ hydrate tends to be higher. A $CO_2$-content rate of a $CO_2$ hydrate can be, depending on the producing method of the $CO_2$ hydrate, in the order of about 3 to 28 wt %, which is notably high compared with a $CO_2$-content rate of carbonated water (in the order of about 0.5 wt %).

Further, Patent Document 4 discloses a method for producing a mass of consolidated carbon dioxide clathrate by compressing produced carbon dioxide gas clathrate ($CO_2$ hydrate) particles using a compression instrument such as a piston. It is described that the mass of carbon dioxide gas clathrate settle at a specified place of the deep-sea floor without being carried away by the deep-sea water. It is described that the technology can be utilized for reducing carbon dioxide gas in the atmosphere.

As other purposes of use of a $CO_2$ hydrate, it is known to add a $CO_2$ hydrate to a drink and mix them. For example, Patent Document 5 discloses the production of a carbonated drink by mixing a $CO_2$ hydrate with a drink to impart carbonic acid to the drink, and Patent Document 6 discloses that a carbonic acid supplementary medium formed by covering a $CO_2$ hydrate with ice is added to a drink for cooling the lukewarm drink and replenishing a carbon dioxide gas of the flat drink simultaneously.

Thus, it has been known that when ice having a $CO_2$-content rate of 3 wt % or more (preferably a $CO_2$ hydrate) is added to a liquid, bubbles generate from the above-mentioned ice (preferably a $CO_2$ hydrate), however, it has not been known that ultrafine bubbles generate from the above-mentioned ice (preferably a $CO_2$ hydrate).

PRIOR ART DOCUMENTS

Patent Documents

Patent Document 1: Japanese unexamined Patent Application Publication No. 2008-149209
Patent Document 2: Japanese unexamined Patent Application Publication No. 2004-330050
Patent Document 3: Japanese unexamined Patent Application Publication No. 2007-275893
Patent Document 4: Japanese unexamined Patent Application Publication No. 06-039243
Patent Document 5: Japanese unexamined Patent Application Publication No. 2005-224146
Patent Document 6: Japanese Patent No. 4969683

Non-Patent Documents

Non-patent Document 1: "Hydrates of Carbon Dioxide and Methane Mixtures", J. Chem. Eng. Data (1991) 36, 68-71
Non-patent Document 2: "Phase Equilibrium for Clathrate Hydrates Formed with Methane, Ethane, Propane, or Carbon Dioxide at Temperatures below the Freezing Point of Water", J. Chem. Eng. Data (2008), 53, 2182-2188

SUMMARY OF THE INVENTION

Object to be Solved by the Invention

An object of the present invention is to provide an agent for generating ultrafine bubbles capable of easily generating ultrafine bubbles in a liquid without requiring an ultrafine-bubble generator, a method for producing an ultrafine bubble-containing liquid, an ultrafine bubble-containing liquid produced by the producing method, and the like.

Means to Solve the Object

While conducting extensive studies to solve the above object, the present inventors have found that when ice having a $CO_2$-content rate of 3 wt % or more (preferably a $CO_2$ hydrate) is contacted with a liquid (preferably contained in a liquid), ultrafine bubbles can be generated in the liquid without requiring an ultrafine-bubble generator, whereby the present invention has been accomplished. Further, the present inventors have found that when a consolidated $CO_2$ hydrate was used as the ice having a $CO_2$-content rate of 3 wt % or more, a density of the ultrafine bubbles (bubbles/mL) generated in a liquid can be notably increased, whereby the present invention was accomplished. Further, the present inventors have found that it is important to consolidate a $CO_2$ hydrate slurry even with low pressure and carry out sufficient dehydration treatment when preparing a $CO_2$ hydrate for obtaining ultrafine bubbles in a higher density by the $CO_2$ hydrate, whereby the present invention was accomplished. Further, the present inventors have found that when the ice having a $CO_2$-content rate of 3 wt % or more (preferably a $CO_2$ hydrate) is directly melted, the melted liquid containing ultrafine bubbles in a much higher density can be obtained than the case that the ice is contained in a liquid such as water, whereby the present invention was accomplished.

In other words, the present invention relates to (1) an ultrafine bubble generating agent for generating ultrafine bubbles in a liquid, wherein the agent includes ice having a $CO_2$-content rate of 3 wt % or more;

(2) the ultrafine bubble generating agent according to the above (1), wherein the ice having a $CO_2$-content rate of 3 wt % or more is a $CO_2$ hydrate;

(3) the ultrafine bubble generating agent according to the above (1) or (2), wherein the ice having a $CO_2$-content rate of 3 wt % or more is ice having a size with a maximum length of 3 mm or more and having a $CO_2$-content rate of 3 wt % or more;

(4) the ultrafine bubble generating agent according to any one of the above (1) to (3), wherein the ice having a $CO_2$-content rate of 3 wt % or more is ice capable of generating ultrafine bubbles in water so that a density of the ultrafine bubbles is 5 million bubbles/mL or more when measured by the following Measurement Method P1;

(Measurement Method P1)

200 mg/mL of ice of −80 to 0° C. and having a $CO_2$-content rate of 3 wt % or more is added to water of 25° C., allowed to stand for 1 hour under a condition of 25° C., and subsequently a density of the ultrafine bubbles in the water (bubbles/mL) is measured using Malvern NanoSight NS300 or SHIMADZU CORPORATION SALD-7500 nano;

(5) the ultrafine bubble generating agent according to any one of the above (1) to (4), wherein the ice having a $CO_2$-content rate of 3 wt % or more is a consolidated $CO_2$ hydrate;

(6) a method for producing an ultrafine bubble-containing liquid, comprising a step of melting ice having a $CO_2$-content rate of 3 wt % or more;

(7) the method for producing an ultrafine bubble-containing liquid according to the above (6), wherein the step of melting ice having a $CO_2$-content rate of 3 wt % or more is a step of melting ice having a $CO_2$-content rate of 3 wt % or more by contacting the ice with another liquid, or a step of melting ice having a $CO_2$-content rate of 3 wt % or more without contacting the ice with another liquid;

(8) the method for producing an ultrafine bubble-containing liquid according to the above (6) or (7), wherein the ice having a $CO_2$-content rate of 3 wt % or more is ice capable of generating ultrafine bubbles in water so that a density of the ultrafine bubbles is 5 million bubbles/mL or more when measured by the following Measurement Method P1;

(Measurement Method P1)

200 mg/mL of ice of −80 to 0° C. and having a $CO_2$-content rate of 3 wt % or more is added to water of 25° C., allowed stand for 1 hour under a condition of 25° C., and subsequently a density of the ultrafine bubbles in the water (bubbles/mL) is measured using Malvern NanoSight NS300 or SHIMADZU CORPORATION SALD-7500 nano; and (9) the method for producing an ultrafine bubble-containing liquid according to any one of the above (6) to (8), wherein the ice having a $CO_2$-content rate of 3 wt % or more is a consolidated $CO_2$ hydrate.

Effect of the Invention

According to the present invention, an agent for generating ultrafine bubbles capable of easily generating ultrafine bubbles without requiring an ultrafine-bubble generator, a method for producing an ultrafine bubble-containing liquid, an ultrafine bubble-containing liquid produced by the producing method, and the like can be provided.

BRIEF DESCRIPTION OF DRAWINGS

FIG. 1 shows a figure representing the particle size distributions and the generation frequencies (densities) of the bubbles in the bubble-containing waters manufactured in Test 2 in an example to be described later. The abscissa represents the particle size of the bubbles (μm) and the ordinate represents the generation frequencies (densities) of the bubbles (100 million bubbles/mL). In FIG. 1, the line with a part exceeding a density of 1.0×100 million bubbles represents the result of the consolidated $CO_2$ hydrate having a $CO_2$-content rate of 20% ("consolidated 20% CO2GH"), of the two lines having a density of 0.1×100 million bubbles or less at particles sizes of about 0.1 to 0.2 μm, the line with a higher density represents the result of the $CO_2$ hydrate having a $CO_2$-content rate of 20% ("20% CO2GH"), and the line with a lower density represents the result of the $CO_2$ hydrate having a $CO_2$-content rate of 13% ("13% CO2GH").

FIG. 2 shows a figure representing the densities of ultrafine bubbles (million bubbles/mL) when each of 0 mg/mL, 20 mg/mL, 200 mg/mL, 1000 mg/mL, and 1500 mg/mL of the $CO_2$ hydrate having a $CO_2$-content rate of 13% was added to water.

FIG. 3 shows a figure representing the densities of ultrafine bubbles (million bubbles/mL) when each of 0 mg/mL, 20 mg/mL, and 200 mg/mL of the consolidated $CO_2$ hydrate having a $CO_2$-content rate of 20% was added to water.

FIG. 4 shows a figure representing the densities of ultrafine bubbles (million bubbles/mL) when each of 0 mg/mL, 20 mg/mL, and 200 mg/mL of the three types of the $CO_2$ hydrates was added to water. The bar of "13% CO2GH" represents the result of when the $CO_2$ hydrate having a $CO_2$-content rate of 13% was used, the bar of "20% CO2GH" represents the result of when the $CO_2$ hydrate having a $CO_2$-content rate of 20% was used, and the bar of "consolidated 20% CO2GH" represents the result of when the consolidated $CO_2$ hydrate having a $CO_2$-content rate of 20% was used.

FIG. 5 shows a figure representing the densities of ultrafine bubbles (million bubbles/mL) when each of 0 mg, 20 mg, 200 mg, and 1000 mg of the $CO_2$ hydrate having a $CO_2$-content rate of 13% was added to 1 mL of a liquid (water or saline).

FIG. 6 shows a figure representing the densities of ultrafine bubbles (million bubbles/mL) when each of 0 mg and 20 mg of the consolidated $CO_2$ hydrate having a $CO_2$-content rate of 20% was added to 1 mL of a liquid (water or saline).

FIG. 7 shows figures representing the particle size distributions and the generation frequencies (densities) of the bubbles in the bubble-containing water manufactured by adding a $CO_2$ hydrate to water. The abscissa represents the particle size of the bubbles (μm) and the ordinate represents the generation frequencies (densities) of the bubbles (bubbles/mL). Further, the upper row of FIG. 7 represents the result of the bubble-containing water obtained by adding the low-pressure consolidated $CO_2$ hydrate to water, and the lower row of FIG. 7 represents the results of the bubble-containing water obtained by adding the high-pressure consolidated $CO_2$ hydrate to water.

FIG. 8 shows a figure representing ultrafine bubble densities (100 million bubbles/mL) of the bubble-containing water obtained by dissolving 300 mg/mL of a $CO_2$ hydrate in water. The "Low-pressure consolidated" of FIG. 8 represents the result of the case the low-pressure consolidated $CO_2$ hydrate was used, the "High-pressure consolidated" represents the result of the case the high-pressure consolidated $CO_2$ hydrate was used, and the "Typical" represents the result of the case the typical $CO_2$ hydrate was used.

FIG. 9 shows a figure representing the particle size distribution and the generation frequencies (densities) of the bubbles in the $CO_2$ hydrate melt water obtained by directly melting the high-pressure consolidated $CO_2$ hydrate. The abscissa represents the particle size of the bubbles (μm) and the ordinate represents the generation frequencies (densities) of the bubbles (bubbles/mL).

FIG. 10 shows a figure representing each of the ultrafine bubble densities (100 million bubbles/mL) of the "bubble-containing water in which 300 mg/mL of the high-pressure consolidated $CO_2$ hydrate was added to water", the "bubble-containing water in which 1000 mg/mL of the high-pressure consolidated $CO_2$ hydrate was added to water", and the "high-pressure consolidated $CO_2$ hydrate melt water".

FIG. 11 shows a figure representing each of the ultrafine bubble densities (100 million bubbles/mL) of the "bubble-containing water in which 300 mg/mL of the typical $CO_2$ hydrate was added to water", the "bubble-containing water in which 1000 mg/mL of the typical $CO_2$ hydrate was added to water", and the "typical $CO_2$ hydrate melt water".

MODE OF CARRYING OUT THE INVENTION

The present invention includes embodiments such as
[1] an ultrafine bubble generating agent for generating ultrafine bubbles in a liquid, wherein the agent includes ice having a $CO_2$-content rate of 3 wt % or more (hereinafter, also described as the "ultrafine bubble generating agent of the present invention"): and
[2] a method for producing an ultrafine bubble-containing liquid comprising a step of melting ice having a $CO_2$-content rate of 3 wt % or more (hereinafter, also described as the "producing method of the present invention").

Note that the ultrafine bubble generating agent of the present invention in the present DESCRIPTION can be paraphrased as a substance or a composition for generating ultrafine bubbles of the present invention.

1. <Ultrafine Bubble Generating Agent of the Present Invention>

The ultrafine bubble generating agent of the present invention is an ultrafine bubble generating agent for generating ultrafine bubbles in a liquid, wherein the agent includes ice having a $CO_2$-content rate of 3 wt % or more.

(Ice Having a $CO_2$-Content Rate of 3 wt % or More)

The ultrafine bubble generating agent of the present invention is not particularly limited as long as it is an ultrafine bubble generating agent for generating ultrafine bubbles in a liquid and contains ice having a $CO_2$-content rate of 3 wt % or more (hereinafter, also described as the "high $CO_2$-content ice"). The high $CO_2$-content ice may be high $CO_2$-content ice which is not a $CO_2$ hydrate and, from a viewpoint of obtaining ultrafine bubbles in a higher density, a $CO_2$ hydrate is preferable and a consolidated $CO_2$ hydrate is more preferable. A $CO_2$ hydrate is a solid clathrate compound in which carbon dioxide molecules are trapped within cavities of the crystal structure of water molecules. A $CO_2$ hydrate is typically an ice-like crystal structure and releases $CO_2$ while the $CO_2$ hydrate melt, for example, under the standard atmospheric condition and the temperature condition at which an ice melts. Further, As the high $CO_2$-content ice of the present invention, high $CO_2$-content ice which is not a $CO_2$ hydrate may be used without using a $CO_2$ hydrate, a $CO_2$ hydrate may be used without using high $CO_2$-content ice which is not a $CO_2$ hydrate, or high $CO_2$-content ice which is not a $CO_2$ hydrate and a $CO_2$ hydrate may be used in combination. Further, as the $CO_2$ hydrate, a non-consolidated $CO_2$ hydrate may be used without using a consolidated $CO_2$ hydrate, a consolidated $CO_2$ hydrate may be used without using a non-consolidated $CO_2$ hydrate, or a non-consolidated $CO_2$ hydrate and a consolidated $CO_2$ hydrate may be used in combination.

The high $CO_2$-content ice of the present invention preferably includes, in terms of the ultrafine bubble density (bubbles/mL) when measured by the following Measurement Method P1, high $CO_2$-content ice capable of generating ultrafine bubbles in water of preferably 5 million bubbles/mL or more, more preferably 10 million bubbles/mL or more, further preferably 20 million bubbles/mL or more, more preferably 25 million bubbles/mL or more, further preferably 30 million bubbles/mL or more, more preferably 35 million bubbles/mL or more, further preferably 50 million bubbles/mL or more, more preferably 75 million bubbles/mL or more, further preferably 100 million bubbles/mL or more, more preferably 150 million bubbles/mL or more, further preferably 200 million bubbles/mL or more, and more preferably 250 million bubbles/mL or more. Note that, in the present DESCRIPTION, a density of ultrafine bubbles being a specified density or more or a specified density or less when measured by Measurement Method P1 means either one of a measured value by Malvern NanoSight NS300 or a measured value by SHIMADZU CORPORATION SALD-7500 nano (preferably both) being a specified density or more or a specified density or less.

(Measurement Method P1)

200 mg/mL of ice of −80 to 0° C. and having a $CO_2$-content rate of 3 wt % or more is added to water of 25° C., stand for 1 hour under a condition of 25° C., and subsequently a density of the ultrafine bubbles in the water (bubbles/mL) is measured using Malvern NanoSight NS300 or SHIMADZU CORPORATION SALD-7500 nano.

The upper limit of a density of ultrafine bubbles which can be generated in water by the high $CO_2$-content ice of the present invention is not particularly limited and examples of the density of ultrafine bubbles include, when measured by the above-mentioned Measurement Method P1, 10 billion bubbles/mL or less, and 1 billion bubbles/mL or less.

The more specific density of ultrafine bubbles (preferably ultrafine bubbles of $CO_2$) which can be generated in water by the high $CO_2$-content ice of the present invention includes, in terms of the density when measured by Measurement Method P1, 5 million to 10 billion bubbles/mL, 5 million to 1 billion bubbles/mL, 10 million to 10 billion bubbles/mL, 10 million to 1 billion bubbles/mL, 20 million to 10 billion bubbles/mL, 20 million to 1 billion bubbles/mL, 25 million to 10 billion bubbles/mL, 25 million to 1 billion bubbles/mL, 30 million to 10 billion bubbles/mL, 30 million to 1 billion bubbles/mL, 35 million to 10 billion bubbles/mL, 35 million to 1 billion bubbles/mL, 50 million to 10 billion bubbles/mL, 50 million to 1 billion bubbles/mL, 75 million to 10 billion bubbles/mL, 75 million to 1 billion bubbles/mL, 100 million to 10 billion bubbles/mL, 100 million to 1 billion bubbles/mL, 150 million to 10 billion bubbles/mL, 150 million to 1 billion bubbles/mL, 200 million to 10 billion bubbles/mL, 200 million to 1 billion bubbles/mL, 250 million to 10 billion bubbles/mL, 250 million to 1 billion bubbles/mL and the like.

The $CO_2$-content rate in the high $CO_2$-content ice (preferably a $CO_2$ hydrate) of the present invention is not particularly limited as long as the $CO_2$-content rate is 3 wt % or more and includes, from a viewpoint of obtaining ultrafine bubbles in a higher density, preferably 5 wt % or more, more preferably 7 wt % or more, further preferably 10 wt % or more, more preferably 13 wt % or more, further preferably 16 wt % or more, and more preferably 18 wt % or more. Further, the upper limit is not particularly limited and includes 30 wt %, 28 wt %, and 26 wt %. The more specific $CO_2$-content rate in the high $CO_2$-content ice (preferably a $CO_2$ hydrate) includes 5 to 30 wt %, 7 to 30 wt %, 10 to 30 wt %, 13 to 30 wt %, 16 to 30 wt %, 18 to 30 wt %, 5 to 28 wt %, 7 to 28 wt %, 10 to 28 wt %, 13 to 28 wt %, 16 to 28 wt %, 18 to 28 wt %, 5 to 26 wt %, 7 to 26 wt %, 10 to 26 wt %, 13 to 26 wt %, 16 to 26 wt %, 18 to 26 wt % and the like.

The $CO_2$-content rate in the high $CO_2$-content ice of the present invention can be adjusted by "high or low $CO_2$ partial pressure" during producing the high $CO_2$-content ice of the present invention and, for example, when $CO_2$ partial pressure is increased, a $CO_2$-content rate of the high $CO_2$-content ice can be increased. Further, when the high $CO_2$-content ice is a $CO_2$ hydrate, a $CO_2$-content rate of the $CO_2$ hydrate can be adjusted by "high or low $CO_2$ partial pressure", "degree of dehydration treatment", "whether or not compression treatment is carried out", "high or low pressure of compression when compression treatment is carried out", and the like during producing a $CO_2$ hydrate. For example, a $CO_2$-content rate of a $CO_2$ hydrate can be increased when "$CO_2$ partial pressure is increased", "degree of dehydration treatment is raised", "compression treatment is carried out", and "pressure of consolidation is increased when compression treatment is carried out" during producing a $CO_2$ hydrate. Note that when high $CO_2$-content ice such as a $CO_2$ hydrate melts, $CO_2$ contained in the high $CO_2$-content ice such as the $CO_2$ hydrate is released and the weight thereof is lost, and thus a $CO_2$-content rate in the high $CO_2$-content ice such as a $CO_2$ hydrate can be calculated from, for example, a weight change when high $CO_2$-content ice such as a $CO_2$ hydrate is melted at room temperature using the following formula (1).

$$(CO_2\text{-content rate})=(\text{sample weight before melted}-\text{sample weight after melted})/\text{sample weight before melted} \quad \text{Formula (1)}$$

Further, all of the high $CO_2$-content ice (preferably a $CO_2$ hydrate) contained in the ultrafine bubble generating agent of the present invention preferably have a $CO_2$-content rate of 3 wt % or more. Further, ice or a $CO_2$ hydrate having a $CO_2$-content rate of less than 3 wt % in which the effect of the present invention can be obtained may be contained in the ultrafine bubble generating agent of the present invention. The proportion (wt %) of the ice and $CO_2$ hydrate having a $CO_2$-content rate of less than 3 wt % to the high $CO_2$-content ice (preferably a $CO_2$ hydrate) contained in the ultrafine bubble generating agent of the present invention includes 10 wt % or less, preferably 5 wt % or less, more preferably 3 wt % or less, and further preferably 1 wt % or less.

The shape of the high $CO_2$-content ice (preferably a $CO_2$ hydrate) of the present invention can be suitably determined and examples include approximately polyhedral shapes such as an approximately spherical shape; an approximately ellipsoidal shape; an approximately cuboidal shape; and a shape in which irregularities are provided with these shapes. Further, the high $CO_2$-content ice (preferably a $CO_2$ hydrate) of the present invention may be crushed pieces (masses) in various shapes obtained by suitably crushing masses of high $CO_2$-content ice (preferably a $CO_2$ hydrate).

The size of the high $CO_2$-content ice (preferably a $CO_2$ hydrate) of the present invention is not particularly limited and can be suitably determined. The lower limit of maximum length of the high $CO_2$-content ice (preferably a $CO_2$ hydrate) of the present invention includes preferably 3 mm or more, more preferably 5 mm or more, further preferably 7 mm or more, and more preferably 10 mm or more, and the upper limit of maximum length includes 150 mm or less, 100 mm or less, 80 mm or less, and 60 mm or less, and more specifically includes 3 mm or more and 150 mm or less, 3 mm or more and 100 mm or less, 3 mm or more and 80 mm or less, 3 mm or more and 60 mm or less, 5 mm or more and 150 mm or less, 5 mm or more and 100 mm or less, 5 mm or more and 80 mm or less, 5 mm or more and 60 mm or less, 10 mm or more and 150 mm or less, 10 mm or more and 100 mm or less, 10 mm or more and 80 mm or less, and 10 mm or more and 60 mm or less.

The "maximum length of the high $CO_2$-content ice" in the present DESCRIPTION means the length of the longest line segment of the line segments connecting 2 points on the surface of the mass of the high $CO_2$-content ice and passing through the center of gravity of the mass. Note that in the case of the high $CO_2$-content ice being, for example, an approximately ellipsoidal shape, the above maximum length represents the major axis (the longest diameter), in the case of an approximately spherical shape, the above maximum length represents the diameter, and in the case of an approximately cuboidal shape, the above maximum length represents the length of the longest diagonal line among the diagonal lines. Further, the "minimum length of the high $CO_2$-content ice" in the present DESCRIPTION means the length of the shortest line segment of the line segments connecting 2 points on the surface of the mass of the high $CO_2$-content ice (preferably a $CO_2$ hydrate) and passing through the center of gravity of the mass. These maximum length and minimum length can be measured using a commercial particle size distribution image analyzer or can also be measured by placing a ruler on the mass of the high $CO_2$-content ice (preferably a $CO_2$ hydrate).

Preferable aspects of the high $CO_2$-content ice (preferably a $CO_2$ hydrate) of the present invention include high $CO_2$-content ice (preferably a $CO_2$ hydrate) having an aspect ratio (maximum length/minimum length) of preferably ranging from 1 to 5, more preferably ranging from 1 to 4, and further preferably ranging from 1 to 3.

The size of the high $CO_2$-content ice (preferably a $CO_2$ hydrate) can be adjusted by the following method. For example, the maximum length of high $CO_2$-content ice which is not a $CO_2$ hydrate can be determined by adjusting the maximum length of a mold used in the producing process of the high $CO_2$-content ice or by adjusting the degree of crushing in the crushing process of the produced high $CO_2$-content ice. Further, the maximum length of a $CO_2$ hydrate can be determined by adjusting the maximum length of a mold used in the compression-molding process of the $CO_2$ hydrate or by adjusting the degree of crushing in the crushing process of the compression-molded $CO_2$ hydrate. Further, the minimum length can be determined by adjusting the minimum length of a mold or by adjusting the degree in the crushing process of the produced high $CO_2$-content ice.

The method for producing the high $CO_2$-content ice of the present invention is not particularly limited as long as it can produce high $CO_2$-content ice. The method for producing high $CO_2$-content ice which is not a $CO_2$ hydrate includes a method in which raw water is frozen while $CO_2$ is blown into the raw water under the conditions which do not fall into a condition for producing a $CO_2$ hydrate. Further, the method for producing a $CO_2$ hydrate includes conventional methods such as a gas-liquid stirring method in which raw water is stirred while $CO_2$ is blown into the raw water under the condition falling into a condition for producing a $CO_2$ hydrate and a water spray method in which raw water is sprayed into $CO_2$ under the condition falling into a condition for producing a $CO_2$ hydrate. A $CO_2$ hydrate produced by these methods is provided typically in slurry in which microparticles of the $CO_2$ hydrate are mixed with unreacted water, and thus it is preferable to carry out dehydration treatment to increase a concentration of $CO_2$ hydrate. The $CO_2$ hydrate with a comparatively lower water content rate due to the dehydration treatment (in other words, a comparatively high concentration of $CO_2$ hydrate) is preferably compression-molded into a certain shape (for example, spherical or cuboidal shape) using a pelleting machine. The compression-molded $CO_2$ hydrate can be preferably used as one type of the consolidated $CO_2$ hydrate of the present invention. The compression-molded $CO_2$ hydrate may be directly used in the present invention, or may further be crushed or the like, as necessary. Note that the methods using raw water as described above are comparatively widely used as the method for producing $CO_2$ hydrates, and a method for producing $CO_2$ hydrates in which micro ice (raw ice), in place of water (raw water), is reacted with $CO_2$ under the conditions of a low temperature and low $CO_2$ partial pressure can also be used.

The above "condition for producing a $CO_2$ hydrate" is, as described above, a condition in which $CO_2$ partial pressure ($CO_2$ pressure) is higher than the equilibrium pressure of a $CO_2$ hydrate at the temperature. The above "a condition in which $CO_2$ partial pressure is higher than the equilibrium pressure of a $CO_2$ hydrate" is presented as, in the equilibrium pressure curve of a $CO_2$ hydrate (for example, the ordinate represents $CO_2$ pressure and the abscissa represents temperature) disclosed in FIG. 2 of Non-patent Document 1 (J. Chem. Eng. Data (1991) 36, 68-71), and FIG. 7 and FIG. 15 of Non-patent Document 2 (J. Chem. Eng. Data (2008), 53, 2182-2188), a combination condition of $CO_2$ pressure and a temperature within the region of the high pressure side of the curve (the upper part of the curve in the case where, for example, the ordinate represents $CO_2$ pressure and the abscissa represents temperature in the equilibrium pressure curve of the $CO_2$ hydrate). Specific examples of the condition for producing a $CO_2$ hydrate include a combination condition in "a range from −20 to 4° C." and "a range from 1.8 to 4 MPa of carbon dioxide pressure", and a combination condition in "a range from −20 to −4° C." and "a range from 1.3 to 1.8 MPa of carbon dioxide pressure".

The content of high $CO_2$-content ice (preferably a $CO_2$ hydrate) in the ultrafine bubble generating agent of the present invention is not particularly limited and for example, can be within a range from 5 to 100 wt %, preferably within a range from 30 to 100 wt %, more preferably within a range from 50 to 100 wt %, and further preferably within a range from 70 to 100 wt %.

The "consolidated $CO_2$ hydrate" in the present invention means a $CO_2$ hydrate in which a $CO_2$ hydrate rate is 40 to 90% (preferably 50 to 90%, and more preferably 60 to 90%). The $CO_2$ hydrate rate means a weight proportion (%) of a $CO_2$ hydrate to a weight of a $CO_2$ hydrate mass. The $CO_2$ hydrate rate can be calculated by the following formula (2).

$$CO_2 \text{ Hydrate rate (\%)} = \{(\text{sample weight before melted} - \text{sample weight after melted}) \div (\text{sample weight before melted} - \text{sample weight after melted})/44 \times 5.75 \times 18\} \times 100/\text{sample weight before melted} \quad \text{Formula (2)}$$

Formula (2) is described below. (Sample weight before melted−sample weight after melted) is a contained $CO_2$ gas weight. A water amount required to contain a $CO_2$ gas as a hydrate is calculated using theoretical hydration number 5.75, molecular weight of $CO_2$ 44, and molecular weight of water 18, and the rest of water is considered as adhesion water which does not constitute the hydrate.

Preferable consolidated $CO_2$ hydrate of the present invention includes, in terms of the ultrafine bubble densities (bubbles/mL) when measured by the above-mentioned Measurement Method P1, a $CO_2$ hydrate capable of generating ultrafine bubbles in water of 50 million to 10 billion bubbles/mL, 50 million to 1 billion bubbles/mL, preferably 75 million to 10 billion bubbles/mL, 75 million to 1 billion bubbles/mL, further preferably 100 million to 10 billion bubbles/mL, 100 million to 1 billion bubbles/mL, more preferably 150 million to 10 billion bubbles/mL, 150 million to 1 billion/mL, further preferably 200 million to 10 billion bubbles/mL, 200 million to 1 billion bubbles/mL, more preferably 250 million to 10 billion bubbles/mL, and 250 million to 1 billion bubbles/mL. Further, the preferable $CO_2$-content rate of a consolidated $CO_2$ hydrate of the present invention is, from a viewpoint of obtaining ultrafine bubbles in a higher density, preferably 7 wt % or more, more preferably 10 wt % or more, further preferably 13 wt % or more, more preferably 16 wt % or more, and further preferably 18 wt % or more. Further, the upper limit value is not particularly limited and includes 30 wt %, 28 wt %, and 26 wt %. The more specific preferable $CO_2$-content rate of a consolidated $CO_2$ hydrate of the present invention includes 7 to 30 wt %, 10 to 30 wt %, 13 to 30 wt %, 16 to 30 wt %, 18 to 30 wt %, 7 to 28 wt %, 10 to 28 wt %, 13 to 28 wt %, 16 to 28 wt %, 18 to 28 wt %, 7 to 26 wt %, 10 to 26 wt %, 13 to 26 wt %, 16 to 26 wt %, 18 to 26 wt % and the like.

The method for producing a consolidated $CO_2$ hydrate of the present invention is not particularly limited and examples preferably include the following producing method.

Conventional methods can be used, such as a gas-liquid stirring method in which raw water is stirred while $CO_2$ is blown into the raw water under the condition falling into the condition for producing a $CO_2$ hydrate and a water spray method in which raw water is sprayed into $CO_2$ under the condition falling into the condition for producing a $CO_2$ hydrate. A $CO_2$ hydrate produced by these methods is provided typically in slurry in which microparticles of the $CO_2$ hydrate are mixed with unreacted water. By carrying out dehydration treatment and compression treatment of the slurry, a consolidated $CO_2$ hydrate can be produced. For dehydration treatment and compression treatment of the slurry containing $CO_2$ hydrate particles and water, dehydration treatment and compression treatment, for example, may be separately carried out sequentially such as dehydration treatment of the slurry is carried out and subsequently compression treatment of $CO_2$ hydrate particles is carried out. Further, dehydration treatment and compression treatment may be carried out simultaneously such as compression treatment of the slurry is carried out under a condition, wherein water in the slurry can be discharged. From a viewpoint of obtaining ultrafine bubbles in a higher density, it is preferable to carry out dehydration treatment and compression treatment simultaneously, and it is more preferable to carry out dehydration treatment and compression treatment simultaneously under the condition for producing a $CO_2$ hydrate. Compression treatment of $CO_2$ hydrate particles or compression treatment of the slurry can be carried out using a commercial consolidation molding machine or the like. Examples of the pressure during compression treatment include 0.1 to 100 Mpa, 0.8 to 100 Mpa, 1 to 100 Mpa, 1 to 50 Mpa, 1 to 30 Mpa, 1 to 15 Mpa, 1 to 10 Mpa, 2.5 to 10 Mpa, and 2.5 to 9 Mpa. The "low-pressure consolidated $CO_2$ hydrate" in the present DESCRIPTION means a consolidated $CO_2$ hydrate to which pressure of 0.8 Mpa or more and less than 2 Mpa is applied during compression treatment, and the "high-pressure consolidated $CO_2$ hydrate" means a consolidated $CO_2$ hydrate to which pressure of 2 Mpa or more (preferably 2 to 100 Mpa) is applied during compression treatment. Note that when sufficient dehydration treatment of the above-mentioned slurry is carried out, a $CO_2$ hydrate rate increases typically about 40%, and when compression treatment of $CO_2$ hydrate particles is carried out at 2.5 Mpa after the sufficient dehydration treatment, a $CO_2$ hydrate rate increases typically about 60%, and when compression treatment of $CO_2$ hydrate particles is carried out at 9 Mpa after the dehydration treatment, a $CO_2$ hydrate rate increases typically about 90%.

The high $CO_2$-content ice (preferably a $CO_2$ hydrate) in the ultrafine bubble generating agent of the present invention may be a high $CO_2$-content ice (preferably a $CO_2$ hydrate) consisting only of $CO_2$ and ice (hereinafter, also described as "high $CO_2$-content ice (preferably a $CO_2$ hydrate) which does not contain any optional components") and may be a high $CO_2$-content ice (preferably a $CO_2$ hydrate) which further contains any optional components in accordance with the purpose of use of the ultrafine bubble generating agent. Further, the ultrafine bubble generating agent of the present invention may be an agent for generating ultrafine bubbles consisting only of the "high $CO_2$-content ice (preferably a $CO_2$ hydrate) which does not contain any optional components" or the "high $CO_2$-content ice (preferably a $CO_2$ hydrate) which contains any optional components", or may further contain any component other than these high $CO_2$-content ice (preferably a $CO_2$ hydrate).

When the ultrafine bubble generating agent of the present invention contains high $CO_2$-content ice other than a $CO_2$ hydrate, it is preferable to retain the ultrafine bubble generating agent of the present invention at a temperature and pressure at which the ice does not melt during distribution and storage. Examples of the temperature and pressure include a condition of 0° C. or less at normal pressure (for example, 1 atm). On the other hand, $CO_2$ hydrates, depending on the producing method or the like, may have good storability and stability. Thus, when the ultrafine bubble generating agent of the present invention contains a $CO_2$ hydrate as high $CO_2$-content ice, the ultrafine bubble generating agent of the present invention may be retained at room temperature (5 to 35° C.) and normal pressure (for example, 1 atm) during distribution and storage and, from a viewpoint of retaining the ultrafine bubble generating agent of the present invention for a longer period and more stably, it is preferable to retain the ultrafine bubble generating agent of the present invention "under a low-temperature condition" or "under a high-pressure condition", or "under a low-temperature condition and a high-pressure condition" during distribution, storage and the like. Of these, from a viewpoint of a simple and easy retention, it is preferable to retain the ultrafine bubble generating agent "under a low-temperature condition", and it is more preferable to retain the ultrafine bubble generating agent "under a low-temperature condition" at normal pressure (for example, 1 atm).

The upper limit temperature of the above "under a low-temperature condition" includes 10° C. or less, preferably 5° C. or less, more preferably 0° C. or less, further preferably −5° C. or less, more preferably −10° C. or less, further preferably −15° C. or less, more preferably −20° C., and further preferably −25° C., and the lower limit temperature of the above "under a low-temperature condition" includes −273° C. or more, −80° C. or more, −50° C. or more, −40° C. or more, −30° C. or more, and the like.

The lower limit pressure of the above "under a high-pressure condition" includes 1.036 atm or more, preferably 1.135 atm or more, more preferably 1.283 atm or more, and further preferably 1.480 atm or more, and the upper limit pressure of the above "under high-pressure condition" includes 14.80 atm or less, 11.84 atm or less, 9.869 atm or less, 7.895 atm or less, 4.935 atm or less, and the like.

(Liquid)

As mentioned above, the ultrafine bubble generating agent of the present invention is an agent to generate ultrafine bubbles in a liquid. The "liquid" in the present invention is a collective term of the following liquids of (A) to (C).

(A) A liquid in which the ultrafine bubble generating agent containing high $CO_2$-content ice of the present invention itself melts (hereinafter, simply described as "melt liquid");

(B) liquids other than the melt liquid (hereinafter, simply described as "another liquid");

(C) a mixed liquid of the melt liquid and the another liquid;

The "liquid" in the present invention is not particularly limited as long as it is a liquid in which high $CO_2$-content ice (preferably a $CO_2$ hydrate) can generate ultrafine bubbles when the high $CO_2$-content ice (preferably a $CO_2$ hydrate) is contained in the liquid, or it is a liquid in which ultrafine bubbles can generate when high $CO_2$-content ice (preferably a $CO_2$ hydrate) is melted without being contacted with another liquid, and examples include (i) "a hydrophilic solvent", (ii) "a hydrophobic solvent", (iii) "a mixed solvent of a hydrophilic solvent and a hydrophobic solvent", and "a liquid in which any solute is contained in any of the solvents of (i) to (iii)". The temperature condition and pressure condition for the "liquid" of the present invention to be in a liquid state cannot be generally specified because those conditions vary depending on the kind of solvent, the purpose of use of the liquid, the usage condition of the liquid, and the like and preferably include a liquid which is in a liquid state under a condition of 20° C. and 1 atm.

The "hydrophilic solvent" used in the present invention is a solvent having a solubility parameter (SP value) of preferably 20 or more, and further preferably 29.9 or more. Specifically, it is preferable to use at least one selected from the group consisting of water (47.9), polyhydric alcohols, and lower alcohols. Polyhydric alcohol includes dihydric alcohols such as ethylene glycol (29.9), diethylene glycol (24.8), triethylene glycol (21.9), tetraethylene glycol (20.3), propylene glycol (25.8) and the like, trihydric alcohols such as glycerin (33.8), diglycerin, triglycerin, polyglycerin, trimethylolpropane and the like, tetra- or higher hydric alcohols such as diglycerin, triglycerin, polyglycerin, pentaerythritol, sorbitol and the like, hexitols such as sorbitol and the like, aldose such as glucose and the like, compounds having a glucose skeleton such as sucrose and the like, and pentaerythritol, and the like. Lower alcohol includes isopropanol (23.5), butyl alcohol (23.3), and ethyl alcohol (26.9). Two or more of these hydrophilic solvents may be used in combination. Note that the numerical values in the parentheses show δ value of the solubility parameter. For a preferable hydrophilic solvent in the present invention, it is preferable to contain at least water, and it is more preferable to be water.

The "hydrophobic solvent" used in the present invention is preferably an organic solvent having a solubility parameter (SP value) of less than 20.0, and specifically preferably a hydrocarbon solvent or a silicone solvent or a mixture thereof. Examples of the hydrocarbon solvent can include aliphatic hydrocarbons such as hexane (14.9), heptane (14.3), dodecane (16.2), cyclohexane (16.8), methylcyclohexane (16.1), octane (16.0), and hydrogenated triisobutylene and the like, aromatic hydrocarbons such as benzene (18.8), toluene (18.2), ethylbenzene (18.0), xylene (18.0) and the like, halogenated hydrocarbons such as chloroform (19.3), 1,2-dichloroethane (19.9), trichloroethylene (19.1) and the like, and the like. Examples of the silicone solvent include octamethylcyclotetrasiloxane, decamethylcyclopentasiloxane, hexamethyldisiloxane, octamethyltrisiloxane and the like. Of these, hexane (14.9) and cyclohexane (16.8) are particularly preferable. Two or more of these hydrophobic solvents may be used in combination.

The "solute" in the above "a liquid in which any solute is contained in any of the solvents of (i) to (iii)" is not particularly limited as long as it is a solute with which high $CO_2$-content ice (preferably a $CO_2$ hydrate) can generate ultrafine bubbles when the high $CO_2$-content ice (preferably a $CO_2$ hydrate) is contained in the liquid, or it is a solute with which ultrafine bubbles can generate in the melt liquid when the high $CO_2$-content ice (preferably a $CO_2$ hydrate) is melted without being contacted with another liquid. The "liquid in which any solute is contained in any of the solvents of (i) to (iii)" specifically includes saline.

The ultrafine bubble generating agent of the present invention may be kept in a container. The shape and material of the container is not particularly limited and examples include a plastic bottle container.

The ultrafine bubble generating agent of the present invention preferably includes, in terms of the ultrafine bubble density (bubbles/mL) when measured by the following Measurement Method P2, an ultrafine bubble generating agent capable of generating ultrafine bubbles in water of preferably 5 million bubbles/mL or more, more preferably 10 million bubbles/mL or more, further preferably 20 million bubbles/mL or more, more preferably 25 million bubbles/mL or more, further preferably 30 million bubbles/mL or more, more preferably 35 million bubbles/mL or more, further preferably 50 million bubbles/mL or more, more preferably million bubbles/mL or more, further preferably 100 million bubbles/mL or more, more preferably 150 million bubbles/mL or more, further preferably 200 million bubbles/mL or more, and more preferably 250 million bubbles/mL or more. Note that, in the present DESCRIPTION, a density of ultrafine bubbles being a specified density or more or a specified density or less when measured by Measurement Method P2 means either one of a measured value by Malvern NanoSight NS300 or a measured value by SHIMADZU CORPORATION SALD-7500 nano (preferably both) being a specified density or more or a specified density or less.

(Measurement Method P2)

200 mg/mL, in terms of ice having a $CO_2$-content rate of 3 wt % or more, of the agent for generating ultrafine bubbles of −80 to 0° C. is added to water of 25° C., allowed to stand for 1 hour under a condition of 25° C., and subsequently a density of the ultrafine bubbles in the water (bubbles/mL) is measured using Malvern NanoSight NS300 or SHIMADZU CORPORATION SALD-7500 nano.

The more specific density of ultrafine bubbles (preferably $CO_2$ ultrafine bubbles) which can be generated in water by the ultrafine bubble generating agent of the present invention includes, in terms of the density when measured by Measurement Method P2, 5 million to 10 billion bubbles/mL, 5 million to 1 billion bubbles/mL, 10 million to 10 billion bubbles/mL, 10 million to 1 billion bubbles/mL, 20 million to 10 billion bubbles/mL, 20 million to 1 billion bubbles/mL, 25 million to 10 billion bubbles/mL, 25 million to 1 billion bubbles/mL, 30 million to 10 billion bubbles/mL, million to 1 billion/mL, 35 million to 10 billion bubbles/mL, 35 million to 1 billion bubbles/mL, 50 million to 10 billion bubbles/mL, 50 million to 1 billion bubbles/mL, 75 million to 10 billion bubbles/mL, 75 million to 1 billion bubbles/mL, 100 million to 10 billion bubbles/mL, 100 million to 1 billion bubbles/mL, 150 million to 10 billion bubbles/mL, 150 million to 1 billion bubbles/mL, 200 million to 10 billion bubbles/mL, 200 million to 1 billion bubbles/mL, 250 million to 10 billion bubbles/mL, 250 million to 1 billion bubbles/mL and the like.

The method for using the ultrafine bubble generating agent of the present invention will be described in detail in the paragraph of "Method for Producing the Ultrafine Bubble-Containing Liquid of the Present Invention" to be described later and is not particularly limited as long as it comprises a step of melting the ultrafine bubble generating agent of the present invention. A person skilled in the art can adjust an amount of the ultrafine bubble generating agent of the present invention to be used by referring the present DESCRIPTION in accordance with a content of high $CO_2$-content ice (preferably a $CO_2$ hydrate) in the ultrafine bubble generating agent of the present invention, a $CO_2$ content rate of the high $CO_2$-content ice (preferably a $CO_2$ hydrate), ultrafine bubbles with how much density is needed, and the like.

2. <Method for Producing the Ultrafine Bubble-Containing Liquid of the Present Invention>

The method for producing the ultrafine bubble-containing liquid of the present invention (producing method of the present invention) is not particularly limited as long as it comprises a step of melting ice having a $CO_2$-content rate of 3 wt % or more (preferably a $CO_2$ hydrate). When high $CO_2$-content ice (preferably a $CO_2$ hydrate) is melted, an ultrafine bubble-containing liquid can be produced.

The "step of melting ice having a $CO_2$-content rate of wt % or more" in the present DESCRIPTION preferably includes "a step of melting ice having a $CO_2$-content rate of 3 wt % or more by contacting the ice with another liquid" and "a step of melting ice having a $CO_2$-content rate of 3 wt % or more without contacting the ice with another liquid" and, from a viewpoint of obtaining ultrafine bubbles in a higher density, more preferably includes "a step of melting ice having a $CO_2$-content rate of 3 wt % or more without contacting the ice with another liquid".

The method for "melting ice having a $CO_2$-content rate of 3 wt % or more by contacting the ice with another liquid" in the present DESCRIPTION is not particularly limited as long as it is a method in which high $CO_2$-content ice is contacted with another liquid so as to be the condition under which high $CO_2$-content ice melts and preferably includes a method in which high $CO_2$-content ice is contained in another liquid, of which a method in which high $CO_2$-content ice is added to or put in another liquid and a method in which another liquid are added to or put in high $CO_2$-content ice are more preferably included, of which high $CO_2$-content ice is added to or put in another liquid is further preferably included.

The method for "melting ice having a $CO_2$-content rate of 3 wt % or more without contacting the ice with another liquid" in the present DESCRIPTION is not particularly limited as long as it is a method in which high $CO_2$-content ice is exposed to the condition under which the high $CO_2$-content ice melts without being contacted with another liquid and preferably includes a method of placing high $CO_2$-content ice under the condition that the high $CO_2$-content ice melts, of which a method in which high $CO_2$-content ice kept in a container is allowed to stand under the condition that the high $CO_2$-content ice melts.

The above "condition that high $CO_2$-content ice melts" is not particularly limited as long as it is a condition that high $CO_2$-content ice melts and includes temperature conditions such as 0° C. or more, preferably 0 to 70° C., more preferably 5 to 60° C., and further preferably 10 to 50° C.

The ultrafine bubble generating agent of the present invention may be used as the high $CO_2$-content ice for the producing method of the present invention.

The amount of high $CO_2$-content ice to be used for the producing method of the present invention can be suitably determined by a person skilled in the art in accordance with whether high $CO_2$-content ice is melted by being contacted with another liquid, whether high $CO_2$-content ice is melted without being contacted with another liquid, whether or not high $CO_2$-content ice is a $CO_2$ hydrate, whether or not high $CO_2$-content ice is a consolidated $CO_2$ hydrate, a $CO_2$ content rate of high $CO_2$-content ice, ultrafine bubbles with how much density is needed, or the like. Example of the lower limit of an amount of high $CO_2$-content ice to be used (preferably an amount to be added) (mg/mL) when the high $CO_2$-content ice is melted by being contacted with another liquid include 10 mg/mL or more and is, from a viewpoint of obtaining ultrafine bubbles in a higher density, preferably 20 mg/mL or more, more preferably 50 mg/mL or more, further preferably 100 mg/mL or more, more preferably 150 mg/mL or more, and further preferably 200 mg/mL or more. Further, the upper limit of an amount of high $CO_2$-content ice to be used (preferably an amount to be added) (mg/mL) is not particularly limited and examples include 5000 mg/mL or less, 3000 mg/mL or less, and 2000 mg/mL or less. Note that the amount of high $CO_2$-content ice to be used (mg/mL) means a weight (mg) of high $CO_2$-content ice used (preferably added) per 1 mL of a liquid.

The temperature of a liquid when high $CO_2$-content ice is contacted with the liquid is not particularly limited as long as ultrafine bubbles generate and examples include a range from 1 to 37° C.

Hereinafter, the present invention will be described in detail with reference to examples, however, the present invention is not limited to these examples.

EXAMPLES

Test 1. [Preparation of $CO_2$ Hydrates]
(1) Preparation of $CO_2$ hydrates

A $CO_2$ gas was blown into 4 L of water so as to be 3 MPa and the reaction for producing a $CO_2$ hydrate was allowed to proceed at 1° C. with stirring. Subsequently, the $CO_2$ hydrate was cooled to −20° C. and polyhedrally-shaped $CO_2$ hydrates having the maximum length of 3 mm or more and 60 mm or less were selectively collected and used in the subsequent experiment. Note that the $CO_2$ hydrate having a $CO_2$-content rate of 13% and the $CO_2$ hydrate having a $CO_2$-content rate of 20% were obtained by the preparation method. These $CO_2$ hydrates had a $CO_2$ hydrate rate of about 25%.

(2) Preparation of a Consolidated $CO_2$ Hydrate

A $CO_2$ gas was blown into 4 L of water so as to be 3 MPa and the reaction for producing a $CO_2$ hydrate was allowed to proceed at 1° C. with stirring. A "$CO_2$ hydrate slurry" in which $CO_2$ hydrate particles were suspended in the water was poured into a cylinder-type consolidation molding machine and compression of the $CO_2$ hydrate slurry was carried out for 3 minutes at compression pressure of 2 MPa. Subsequently, it was cooled to −20° C., a cylindrical mass of the consolidated $CO_2$ hydrate was collected from the consolidation molding machine and then the cylindrical mass was crushed. Polyhedrally-shaped consolidated $CO_2$ hydrates having the maximum length of 3 mm or more and 60 mm or less were selectively collected and used in the subsequent experiment. Note that the consolidated $CO_2$ hydrate had a $CO_2$-content rate of 20% and a $CO_2$ hydrate rate of about 60%.

Test 2. [Production of Ultrafine Bubble-Containing Waters Using $CO_2$ Hydrates]

The following experiments were carried out to evaluate whether bubbles in the bubble-containing waters obtained by adding the $CO_2$ hydrates to water were ultrafine bubbles, and the like.

(1) Production of Bubble-Containing Waters Using $CO_2$ Hydrates

One thousand mg (about −80° C.) of one of the following three types of $CO_2$ hydrates (a) to (c) was added to 1 mL of water (about 25° C.) each, subsequently allowed to stand for 1 hour at about 25° C. to manufacture bubble-containing waters.

(a) The $CO_2$ hydrate having a $CO_2$-content rate of 13% prepared in (1) of Test 1 described above:

(b) the $CO_2$ hydrate having a $CO_2$-content rate of 20% prepared in (1) of Test 1 described above:

(c) the consolidated $CO_2$ hydrate having a $CO_2$-content rate of 20% prepared in (2) of Test 1 described above:

(2) Measurement of Bubble Densities (Bubbles/mL) and Particle Sizes (μm) in the Bubble-Containing Waters Densities and particle sizes of the bubbles in the three types of bubble-containing waters produced in the above (1) were measured using SHIMADZU CORPORATION "SALD-7500 nano". The results of the particle size distributions and generation frequencies (densities) of the bubbles in the three types of bubble-containing waters are shown in FIG. 1. Further, particle numbers (bubbles/mL) and median particle sizes (μm) of ultrafine bubbles in the three types of bubble-containing waters are shown in Table 1.

TABLE 1

| | Ultrafine bubble particle numbers (10 thousand bubbles/mL) | Median particle size (μm) |
| --- | --- | --- |
| 13% $CO_2$ Hydrate | About 3700 | 0.184 |
| 20% $CO_2$ Hydrate | About 4700 | 0.159 |
| Consolidated 20% $CO_2$ Hydrate | About 68400 | 0.11 |

(3) Results

As shown in FIG. 1, the generation of ultrafine bubbles (diameters of 1.0 μm or less) was observed in all cases where any of the three types of $CO_2$ hydrates was used. Further, as revealed from the results of the 13% $CO_2$ hydrate and the 20% $CO_2$ hydrate of Table 1, there was no notable differences in the ultrafine bubble density and the median particle size in the ultrafine bubble-containing waters obtained by using the $CO_2$ hydrates which were not consolidated. On the other hand, the ultrafine bubble-containing water obtained by using the 20% $CO_2$ hydrate which was not consolidated had an ultrafine bubble density of about 47 million bubbles/mL, whereas the ultrafine bubble-containing water obtained by using the consolidated 20% $CO_2$ hydrate had an ultrafine bubble density of about 684 million bubbles/mL. In other words, the obtained ultrafine bubble density was increased to about 15 times by the consolidation of the $CO_2$ hydrate. This shows that the ultrafine bubble density to be obtained notably increases by the consolidation of $CO_2$ hydrates.

Test 3. [Impact of the Amount of $CO_2$ Hydrates Added, etc. on the Density of Ultrafine Bubbles Produced]

The following experiment was carried out to evaluate the impacts of an amount of $CO_2$ hydrate added, $CO_2$ concentration, and presence or absence of consolidation on the density of ultrafine bubbles produced. Note that, in Test 3, densities of ultrafine bubbles were measured using Malvern "NanoSight NS300".

(1) Production of Ultrafine Bubble-Containing Waters Using $CO_2$ Hydrates and Measurement of Ultrafine Bubble Densities Each of 0 mg, 20 mg, 200 mg, 1000 mg, and 1500 mg of the $CO_2$ hydrate (about −80° C.) having a $CO_2$-content rate of 13% was added to 1 mL of water (about 25° C.) and subsequently allowed to stand for 1 hour at about 25° C. to produce each of the ultrafine bubble-containing waters. A density of ultrafine bubbles (million bubbles/mL) of each of the ultrafine bubble-containing waters was measured using "NanoSight NS300". The results are shown in FIG. 2.

Each of 0 mg, 20 mg, and 200 mg of the consolidated $CO_2$ hydrate (about −80° C.) having a $CO_2$-content rate of 20% was added to 1 mL of water (about 25° C.) and subsequently allowed to stand for 1 hour at about 25° C. to produce each of the ultrafine bubble-containing waters. A density of ultrafine bubbles (million bubbles/mL) of each of the ultrafine bubble-containing waters was measured using "NanoSight NS300". The results are shown in FIG. 3.

Each of 0 mg, 20 mg, and 200 mg of the $CO_2$ hydrate (about −80° C.) having a $CO_2$-content rate of 13%, the $CO_2$ hydrate (about −80° C.) having a $CO_2$-content rate of 20%, and the consolidated $CO_2$ hydrate (about −80° C.) having a $CO_2$-content rate of 20% was added to 1 mL of water (about 25° C.) and subsequently allowed to stand for 1 hour at about 25° C. to produce each of the ultrafine bubble-containing waters. A density of ultrafine bubbles (million bubbles/mL) of each of the ultrafine bubble-containing waters was measured using "NanoSight NS300". The results are shown in FIG. 4.

(2) Results

The results of FIGS. 2 to 4 revealed that the density of produced ultrafine bubbles tends to rely basically on the amount of a $CO_2$ hydrate added. Further, the $CO_2$ hydrate having a $CO_2$-content rate of 13% had an ultrafine bubble density of about 67 million bubbles/mL when 1000 mg/mL was added, whereas an ultrafine bubble density increased only to about 76 million bubbles/mL even when 1500 mg/mL was added, observing that the ultrafine bubble density tended to saturate in the order of about 80 million bubbles/mL (FIG. 2).

Further, the produced ultrafine bubble density was about 39 million bubbles/mL when 200 mg/mL of the $CO_2$ hydrate having a $CO_2$-content rate of 20% was added (FIG. 4), whereas the produced ultrafine bubble density reached about 300 million bubbles/mL when 200 mg/mL of the consolidated $CO_2$ hydrate having a $CO_2$-content rate of 20% was added (FIG. 3, FIG. 4). These results showed that the consolidated $CO_2$ hydrate can generate a high density of ultrafine bubbles even a small amount is added. The results of FIG. 1 and FIG. 4 revealed that whether or not a $CO_2$ hydrate is consolidated causes a more significant impact rather than the $CO_2$-content rate of a $CO_2$ hydrate for obtaining ultrafine bubbles in a higher density, more specifically, for obtaining ultrafine bubbles of, for example, 100 million bubbles/mL. In other words, it showed that consolidated $CO_2$ hydrates are preferable from a viewpoint of obtaining ultrafine bubbles in a higher density.

Test 4. [Impact of the Liquid Type on the Density of Ultrafine Bubbles Produced]

The following experiment was carried out to evaluate whether ultrafine bubbles generate even when $CO_2$ hydrates were added to a liquid other than water. Note that, salt water containing 0.9 w/v % of sodium chloride was used as the saline. Further, in Test 4, densities of ultrafine bubbles were measured using Malvern "NanoSight NS300".

(1) Production of Ultrafine Bubble-Containing Liquids Using $CO_2$ Hydrates and Measurement of Densities of Ultrafine Bubbles Each of 0 mg, 20 mg, 200 mg, and 1000 mg of the $CO_2$ hydrate (about −80° C.) having a $CO_2$-content rate of 13% was added to 1 mL of a liquid (water or saline) (about 25° C.) and subsequently allowed to stand for 1 hour at about 25° C. to produce each of the ultrafine bubble-containing liquids. A density of ultrafine bubbles (million bubbles/mL) of each of the ultrafine bubble-containing liquids was measured using "NanoSight NS300". The results are shown in FIG. 5.

Further, each of 0 mg and 20 mg of the consolidated $CO_2$ hydrate (about −80° C.) having a $CO_2$-content rate of 20% was added to 1 mL of a liquid (water or saline) (about 25° C.) and subsequently allowed to stand for 1 hour at about 25° C. to produce each of the ultrafine bubble-containing liquids. A density of ultrafine bubbles (million bubbles/mL) of each of the ultrafine bubble-containing liquids was measured using "NanoSight NS300". The results are shown in FIG. 6.

(2) Results

The results of FIG. 5 and FIG. 6 showed that ultrafine bubbles generate even when the $CO_2$ hydrates were added to saline. These results showed that ultrafine bubbles can be generated even when $CO_2$ hydrates are added to a liquid other than water.

Test 4. [Preparation of Consolidated $CO_2$ Hydrates, etc.]

(1) Preparation of a Low-Pressure Consolidated $CO_2$ Hydrate

A $CO_2$ gas was blown into 4 L of water so as to be 3 MPa and the reaction for producing a $CO_2$ hydrate was allowed to proceed at 1° C. with stirring, obtaining a $CO_2$ hydrate slurry in which $CO_2$ hydrate particles were suspended in water. The $CO_2$ hydrate slurry was poured into a cylinder-type consolidation molding machine and dehydrated by differential pressure (within 1 MPa) between inside the consolidation molding machine and dehydration drain to concentrate crystals of the $CO_2$ hydrate particles. Subsequently, it was cooled to −20° C. and polyhedrally-shaped $CO_2$ hydrates having the maximum length of 3 mm or more and 60 mm or less were selectively collected from the consolidation molding machine and used in the subsequent experiment as the "low-pressure consolidated $CO_2$ hydrate". The low-pressure consolidated $CO_2$ hydrate had a $CO_2$-content rate of 24 wt % and a $CO_2$ hydrate rate of about 40%.

(2) Preparation of a High-Pressure Consolidated $CO_2$ Hydrate

A $CO_2$ gas was blown into 4 L of water so as to be 3 MPa and the reaction for producing a $CO_2$ hydrate was allowed to proceed at 1° C. with stirring, obtaining a $CO_2$ hydrate slurry in which $CO_2$ hydrate particles were suspended in water. The $CO_2$ hydrate slurry was poured into a cylinder-type consolidation molding machine and dehydrated by differential pressure (about 1 MPa) between inside the consolidation molding machine and dehydration drain to concentrate crystals of the $CO_2$ hydrate particles. These crystals of the $CO_2$ hydrate particles were compressed with compression pressure of 10 MPa, subsequently cooled to −20° C., a cylindrical mass of the $CO_2$ hydrate was collected from the consolidation molding machine and the cylindrical mass was crushed. Polyhedrally-shaped $CO_2$ hydrates having the maximum length of 3 mm or more and 60 mm or less were selectively collected and used in the subsequent experiment as the "high-pressure consolidated $CO_2$ hydrate". The high-pressure consolidated $CO_2$ hydrate had a $CO_2$-content rate of 24 wt % and a $CO_2$ hydrate rate of about 60%.

(3) Preparation of a Typical $CO_2$ Hydrate

A $CO_2$ gas was blown into 4 L of water so as to be 3 MPa and the reaction for producing a $CO_2$ hydrate was allowed to proceed at 1° C. with stirring, obtaining a $CO_2$ hydrate slurry in which $CO_2$ hydrate particles were suspended in water. Subsequently, the $CO_2$ hydrate slurry was cooled to −20° C. and polyhedrally-shaped $CO_2$ hydrates having the maximum length of 3 mm or more and 60 mm or less were selectively collected and used in the subsequent experiment as the "typical $CO_2$ hydrate". The "typical $CO_2$ hydrate" had a $CO_2$-content rate of 13 wt % and a $CO_2$ hydrate rate of about 25%.

Test 5. [Production of Ultrafine Bubble-Containing Waters Using the Consolidated $CO_2$ Hydrates, etc.]

The following experiments were carried out to evaluate densities, particle sizes, and the like of the ultrafine bubbles in bubble-containing waters obtained by adding the consolidated $CO_2$ hydrates and the like to water.

(1) Production of Bubble-Containing Waters Using $CO_2$ Hydrates

Three hundred mg (about −80° C.) of one of the following three types of $CO_2$ hydrates (d) to (f) was added to 1 mL of water (about 25° C.) each, and subsequently allowed to stand for 1 hour at about 25° C. to manufacture bubble-containing waters.

(d) The low-pressure consolidated $CO_2$ hydrate having a $CO_2$-content rate of 24 wt % prepared in (1) of Test 4 described above:

(e) the high-pressure consolidated $CO_2$ hydrate having a $CO_2$-content rate of 24 wt % prepared in (2) of Test 4 described above:

(f) the typical $CO_2$ hydrate having a $CO_2$-content rate of 13 wt % prepared in (3) of Test 4 described above:

(2) Measurement of Densities and Particle Sizes of the Bubbles in the Bubble-Containing Waters Densities (bubbles/mL) and particle sizes (μm) of the bubbles in the three types of bubble-containing waters produced in the above (1) were measured using SHIMADZU CORPORATION "SALD-7500 nano". The upper row of FIG. 7 shows the results of particle size distribution and generation frequencies (densities) of the bubbles in the bubble-containing water obtained by adding the low-pressure consolidated $CO_2$ hydrate to water, and the lower row of FIG. 7 shows the results of particle size distribution and generation frequencies (densities) of the bubbles in the bubble-containing water obtained by adding the high-pressure consolidated $CO_2$ hydrate to water. Further, the densities of ultrafine bubbles (million bubbles/mL) of the three types of bubble-containing waters produced in the above (1) are shown in FIG. 8.

(3) Results

The results of experiment showed that the bubbles obtained by dissolving the low-pressure consolidated $CO_2$ hydrate in water (FIG. 7, upper row) and the bubbles obtained by dissolving the high-pressure consolidated $CO_2$ hydrate in water (FIG. 7, lower row) were both ultrafine bubbles having particle sizes of about 60 to 250 nm. Further, the density of about 500 million bubbles/mL in the case of using the low-pressure consolidated $CO_2$ hydrate was notably high compared with about 25 million bubbles/mL in the case of using the typical $CO_2$ hydrate and further was rather higher than about 4.6 billion bubbles/mL in the case of using the high-pressure consolidated $CO_2$ hydrate (FIG. 8). These results revealed that the ultrafine bubble generation capability equivalent to or more than that of the high-pressure consolidated $CO_2$ hydrate can be achieved when the $CO_2$ hydrate slurry was consolidated even with low pressure and sufficiently dehydrated in preparation of $CO_2$ hydrates. This showed that it is important to increase a $CO_2$ hydrate rate of a $CO_2$ hydrate by carrying out dehydration treatment for obtaining ultrafine bubbles of a high density by the $CO_2$ hydrate.

Test 6. [Observation of Ultrafine Bubble Generation in $CO_2$ Hydrate Melt Water]

In the above Test 2 to Test 5, the ultrafine bubble-containing liquids were produced by containing $CO_2$ hydrates in liquids such as water or the like. For that reason, the following experiments were carried out to evaluate whether an ultrafine bubble-containing liquid can be obtained by simply directly melting a $CO_2$ hydrate instead of containing a $CO_2$ hydrate in a liquid such as water or the like.

(1) Preparation of $CO_2$ Hydrate Melt Water

The two types of $CO_2$ hydrates (high-pressure consolidated $CO_2$ hydrate and typical $CO_2$ hydrate) prepared in the above Test 4 were used. Each of these two types of $CO_2$ hydrates was kept in a container and allowed to stand at room temperature until the $CO_2$ hydrates completely melted.

(2) Measurement of Densities and Particle Sizes of the Bubbles in the $CO_2$ Hydrate Melt Waters Each of densities (bubbles/mL) and particle sizes (μm) of the bubbles in the two types of $CO_2$ hydrate melt waters prepared in the above (1) were measured using SHIMADZU CORPORATION "SALD-7500 nano". The results of the particle size distributions and generation frequencies (densities) of the bubbles in the melt water of high-pressure consolidated $CO_2$ hydrate are shown in FIG. 9.

As revealed from the results of FIG. 9, it was shown that the bubbles obtained by melting the high-pressure consolidated $CO_2$ hydrate were ultrafine bubbles having particle sizes of about 60 to 250 nm.

(3) Comparison Between Ultrafine Bubble Density of the $CO_2$ Hydrate Melt Water and Ultrafine Bubble Densities of Bubble-Containing Waters in Which the $CO_2$ Hydrate Was Added to Water Each of ultrafine bubble densities (100 million bubbles/mL) of "bubble-containing water in which 300 mg/mL of the high-pressure consolidated $CO_2$ hydrate was added to water", "bubble-containing water in which 1000 mg/mL of the high-pressure consolidated $CO_2$ hydrate was added to water", and "the high-pressure consolidated $CO_2$ hydrate melt water" were measured using "SALD-7500 nano". The ultrafine bubble densities (100 million bubbles/mL) are shown sequentially from left in FIG. 10.

Further, the results of the same experiment carried out using the typical $CO_2$ hydrate in place of the high-pressure consolidated $CO_2$ hydrate are shown in FIG. 11.

The result of FIG. 10 showed that when the high-pressure consolidated $CO_2$ hydrate was directly melted, ultrafine bubbles having a density of as high as about 1.5 billion bubbles/mL were obtained. This ultrafine bubble density was about 4 times or more when compared with the density in the case of dissolving the high-pressure consolidated $CO_2$ hydrates in water, which was a notably high density. Further, when the $CO_2$ hydrate was directly melted, ultrafine bubbles were obtained in a notably higher density than the case of dissolving the $CO_2$ hydrates in water, which was the same as the case where the typical $CO_2$ hydrate was used (FIG. 11). These results revealed that ultrafine bubbles can be generated in an extremely higher density by directly melting $CO_2$ hydrates than by dissolving $CO_2$ hydrates in water, regardless of the production method of $CO_2$ hydrates.

INDUSTRIAL APPLICABILITY

According to the present invention, an agent for generating ultrafine bubbles capable of easily generating ultrafine bubbles in a liquid without requiring an ultrafine-bubble generator, a method for producing an ultrafine bubble-containing liquid, an ultrafine bubble-containing liquid produced by the producing method, and the like can be provided.

The invention claimed is:

1. A method for producing an ultrafine bubble-containing liquid comprising a step of melting ice having a $CO_2$-content rate of 3 wt % or more, wherein the ice is ice capable of generating ultrafine bubbles in water so that density of the ultrafine bubbles is 50 million bubbles/mL or more when measured by the following Measurement Method P1;

(Measurement Method P1)

200 mg/mL of ice of −80 to 0° C. and having a $CO_2$-content rate of 3 wt % or more is added to water of 25° C., allowed to stand for 1 hour under a condition of 25° C., and subsequently a density of the ultrafine bubbles in the water (bubbles/mL) is measured using a particle size-measuring device.

2. The method for producing an ultrafine bubble-containing liquid according to claim 1, wherein the ice having a $CO_2$-content rate of 3 wt % or more is a $CO_2$ hydrate.

3. The method for producing an ultrafine bubble-containing liquid according to claim 1, wherein the ice having a $CO_2$-content rate of 3 wt % or more is a consolidated $CO_2$ hydrate.

4. The method for producing an ultrafine bubble-containing liquid according to claim 1, wherein the ice having a $CO_2$-content rate of 3 wt % or more is ice having a size with a maximum length of 3 mm or more and having a $CO_2$-content rate of 3 wt % or more.

5. The method for producing an ultrafine bubble-containing liquid according to claim 1, wherein the step of melting ice having a $CO_2$-content rate of 3 wt % or more is a step of melting ice having a $CO_2$-content rate of 3 wt % or more by contacting the ice with a liquid other than a melt liquid of the ice, or a step of melting ice having a $CO_2$-content rate of 3 wt % or more without contacting the ice with the liquid other than the melt liquid of the ice.

* * * * *